Dec. 20, 1932.  F. O. ALBERTSON ET AL  1,891,364
VALVE SEAT GAUGE
Filed Oct. 8, 1930  3 Sheets-Sheet 3
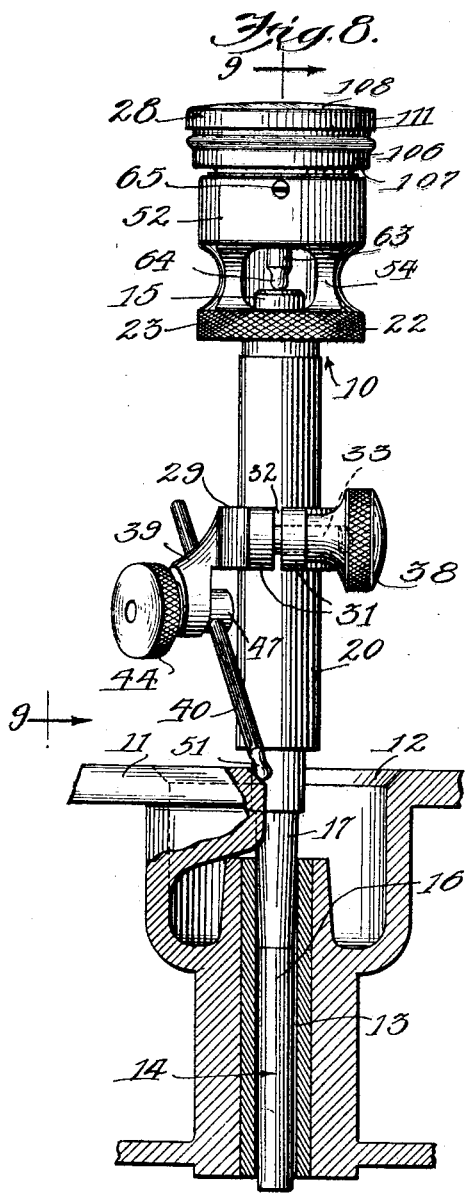
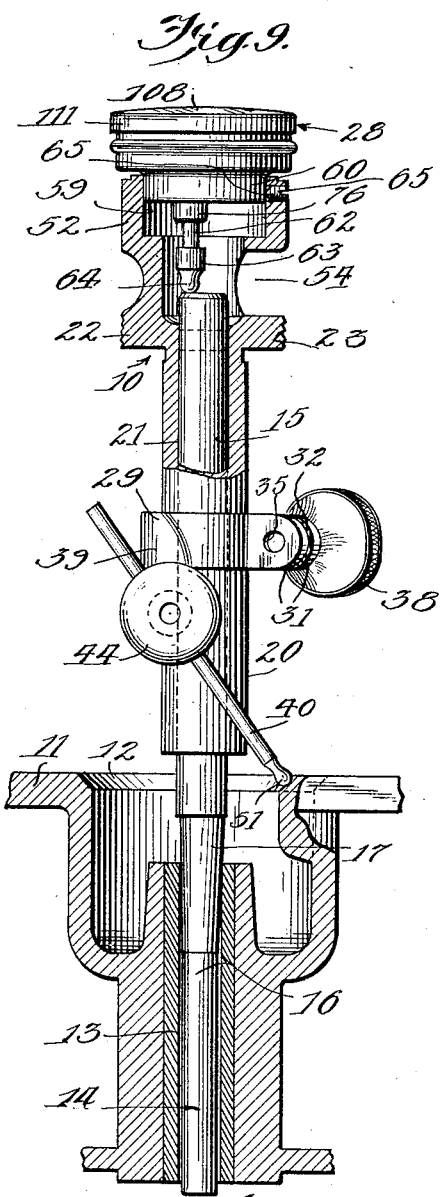

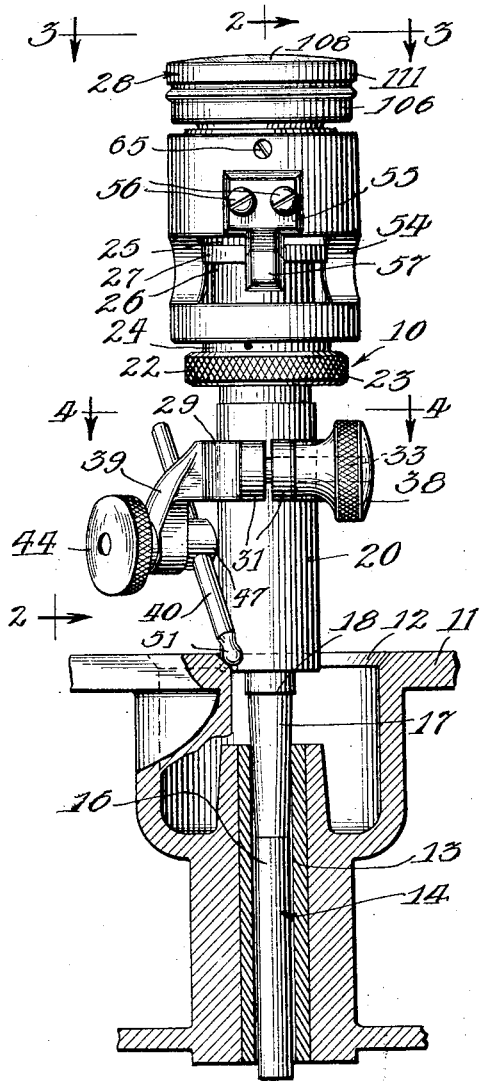

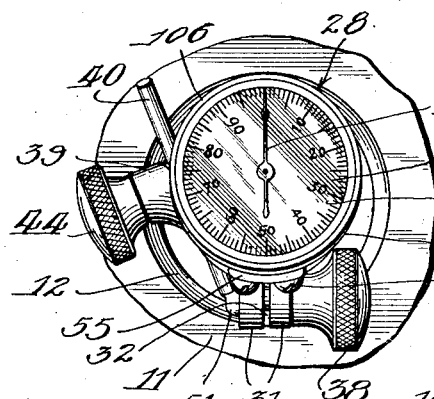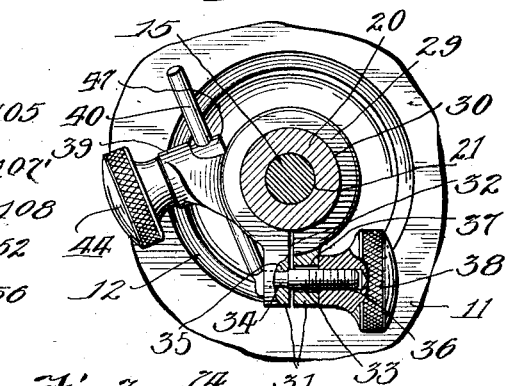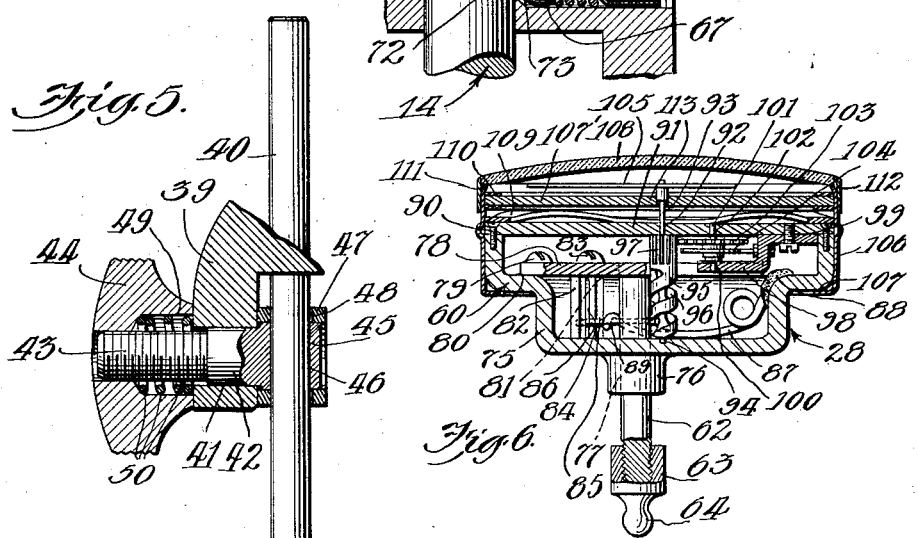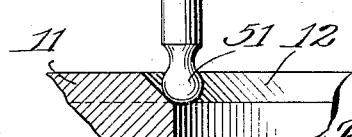

Patented Dec. 20, 1932

1,891,364

UNITED STATES PATENT OFFICE

FRANS O. ALBERTSON AND AXEL MADSEN, OF SIOUX CITY, IOWA, ASSIGNORS TO ALBERTSON & COMPANY, INC., OF SIOUX CITY, IOWA, A CORPORATION OF IOWA

VALVE SEAT GAUGE

Application filed October 8, 1930. Serial No. 487,134.

The present invention relates to valve seat gauges and is particularly concerned with gauges for indicating the condition of concentricity of a valve seat with respect to the valve guide or the uniformity of elevation of a valve seat, or the lack of these qualities.

One of the objects of the present invention is the provision of an improved dial gauge adapted to indicate the condition of a valve seat of an internal combustion engine before and after a valve seat reconstruction operation, to show the improvement in the valve seat.

Another object is the provision of a dial gauge of the class described, which is capable of indicating the concentricity or lack of this quality of the valve seat, with respect to the valve guide, with a high degree of accuracy.

Another object is the provision of a dial gauge of the class described, which is adapted to be used for checking valve seat reconstruction operations or reseating operations.

Another object is the provision of a dial gauge of the class described, so arranged that the dial may be held in fixed position instead of rotating with the gauge arm in the exploration of the valve seat surface, thereby permitting a closer reading than is possible with a moving dial.

Another object is the provision of an improved dial gauge for valve seats, which is sturdy, efficient, accurate and capable of long service with a minimum amount of repairs or replacements of parts, and a gauge which may be manufactured at a low cost, within the means of a vast number of purchasers.

Other objects and advantages of the invention will be apparent from the following description and from the accompanying drawings, in which similar characters of reference indicate similar parts throughout the several views.

Referring to the drawings, of which there are three sheets;

Fig. 1 is an elevational view of one of the preferred forms of the valve seat gauge, constructed according to the present invention;

Fig. 2 is a similar view in a different rotative position, with a part of the gauge body and indicator head shown in section, on a vertical plane on the line 2—2 of Fig. 1;

Fig. 3 is a plan view of the valve seat gauge;

Fig. 4 is a horizontal, sectional view taken on the plane of the line 4—4 of Fig. 1, looking in the direction of the arrows;

Fig. 5 is a sectional view taken on the plane of the line 5—5 of Fig. 2;

Fig. 6 is a sectional view of the indicating unit, taken on the plane of the line 2—2 of Fig. 1;

Fig. 7 is a sectional view showing the means of support of the indicator head on the pilot stem, taken on the plane of the line 7—7 of Fig. 2;

Fig. 8 is a view similar to Fig. 1, of another of the preferred forms of the invention;

Fig. 9 is a similar view in a different rotative position, in partial section along the plane of the line 9—9 of Fig. 8.

The present application relates specifically to the particular type of valve seat gauge illustrated in Figs. 8 and 9. Many of the features of the two types of valve seat gauges of Figs. 1 and 2 or Figs. 8 and 9 are similar, and therefore similar elements are designated by similar numerals, and the two embodiments are described at the same time and differentiated by their different characteristics.

The gauges constructed according to the present invention, are particularly adapted to be used in determining the condition of the valve seats of internal combustion engines, or checking the efficiency of valve seat reconstruction or reseating operations upon the type of valves having an axially located guide for slidably supporting a valve stem, commonly known as poppet valves. Many of the features of the invention, however, are of general application, and may be utilized in connection with other surface gauging operations.

Referring to Figs. 1 and 2, the present dial seat gauge 10 is illustrated in connection with the block 11 of an internal combustion engine having a valve seat 12 and a valve guide 13. The gauge 10 is pereferably used in connection with a pilot stem 14 of the type adapted to be fixedly secured with its axis in alignment with the axis of the valve stem guide 13, and the same pilot stem is preferably employed which is used in the valve reseating or reconstruction operation. The pilot stem is thus in the same position which it assumed during the finishing of the valve seat, and the valve seat may be checked to ascertain the condition of concentricity of the valve seat with respect to the pilot stem and to the axis of the valve stem guide 13.

The valve stem 14 preferably comprises a solid tool steel member having an upper tool receiving and guiding body 15 of substantially cylindrical shape and a lower cylindrical portion 16 of substantially cylindrical shape and adapted to fit in the cylindrical valve stem guide 13 quite closely. For example, a complete set of pilots of this type preferably includes pilots of varying sizes, differing in size by approximately one-thousandth of an inch, and therefore any guide may be fitted with a tolerance of one-thousandth of an inch or less, and the cylindrical portion 16 of the pilot corresponds quite closely to the size of the valve stem guide 13.

The ordinary valve seat guides are intended to be cylindrical and complementary to the cylindrical valve stem, but the ends of the guides usually become tapered from the wear and play of the valve stem. That part of the guide intermediate the ends and slightly spaced from the ends is generally most nearly truly cylindrical, and it is this medial cylindrical part of the guide into which the cylindrical portion of the pilot is intended to fit.

Between the cylindrical portion 16 of the pilot 14 and the tool receiving body 15, the pilot stem 14 is preferably provided with a very gradually tapered or wedging portion 17 terminating in an annular shoulder 18, which definitely limits the degree of insertion of the pilot stem 14 into any guide 13. The tapered portion 17 is of sufficiently gradual taper to be wedged into the pilot stem 13 by hand, the frusto-conical portion 17 of the pilot stem 14, automatically centering the pilot with respect to the guide 13 and the lower cylindrical portion 16 of the pilot also serving to center the pilot stem 14 within the limits of accuracy, which are necessary for good work.

The amount of taper at the frusto-conical portion 17 may vary for pilot stems of different sizes, but is preferably sufficient to permit the pilot to be fixedly secured in the guide 13 by the amount of force which can be applied with a pin passing through the transverse bore 19 at the top of the pilot 14, the pilot being twisted and shoved down axially by the hand of the operator.

For example, the taper should preferably be within the range of fifteen-thousandths of an inch to thirty-thousandths of an inch for each foot of length of the pilot, and is preferably made about twenty-two thousandths of an inch per foot. The pilot stem is centered by the cylindrical portion of the stem, which fits quite closely the worn part of the guide intermediate the ends of the guide, and the pilot is secured in place by the wedging engagement of the tapered portion with the valve stem guide adjacent the ends and where the guide is apt to be slightly enlarged or rounded out.

The valve seat gauge 10 preferably includes a substantially cylindrical body 20 having an axially extending bore 21 adapted to slidably and rotatably receive the cylindrical portion 15 and the bore 21 preferably extends all of the way through the body 20 in the gauges of the type shown in Figs. 1 and 2. At its upper end, the valve gauge body 20 is preferably provided with an annular flange 22, the outer cylindrical surface 23 of which may be knurled or milled to provide a convenient grip for the fingers in rotating the gauge body 20, and the head 24 of the body 20 is preferably provided with a flat upper surface 25 and with an annular groove 26, thus forming another annular flange 27 adapted to retain an indicating unit 28 on the gauge body.

The valve gauge body 20 preferably supports an adjustable collar 29 comprising an annular metal member having a bore 30 for receiving the body 20 and having a pair of laterally projecting lugs 31, the annular member 29 being split at 32 between the lugs 31.

A threaded stud 33 is provided with a reduced end 34, which is secured in a complementary bore 35 in one of the lugs 31 by riveting, and the threaded end 36 of stud 33 extends through an enlarged bore 37 in the other lug 31. A knurled thumb nut 38 is threaded on the end 36 of stud 33 for engaging the adjacent lug 31 and clamping the lugs 31 together to fixedly secure the collar 29 in any adjusted position on the body 20.

The collar 29 is also provided with a depending lug 39 which extends outward and downward from the collar 29 and is spaced sufficiently from the body 20 to make room for the valve seat engaging member or arm 40, adjustably carried by lug 39. Lug 39 is preferably provided with a transverse bore 41 adapted to slidably receive the cylindrical portion 42 of a bolt having a threaded end 43 for receiving a thumb nut 44. The head 45 of bolt 42 may be cylindrical in form, and is preferably provided with a transverse bore 46 adapted to slidably receive the valve seat engaging arm 40 and the head 45 may be provided with a sleeve 47 with a similar transverse bore 48.

The thumb nut 44 is preferably provided with a counter-bore located at its inner end and adapted to receive a coil spring 50 which is located in the annular space of counter-bore 49 about the threaded portion of bolt 42. The spring 50 is under compression and constantly urges nut 44 and bolt 42 to the left in Fig. 5, causing the valve seat engaging member 40 to be clamped between walls of bore 48 in sleeve 47, and the walls of bore 46 in head 45.

The valve seat engaging member is thus resiliently clamped at all times, even when the nut 44 is out of engagement with the side of lug 39, but in such case, the valve seat engaging member 40 may be readily released by axial pressure on the nut 44. The resilient clamping action of the spring 50 may be augmented by threading the nut 44 home against the side of lug 39 and fixedly clamping the arm 40 in any desired adjusted position.

It should be noted that the arm 40 may be rotated on the bolt 42 or adjusted longitudinally of the bolt 42 as desired.

The valve seat engaging arm 40 comprises a substantially cylindrical pin or rod preferably formed of tool steel and provided at its lower end with a ball shaped formation 51 of hardened steel, which is adapted to provide a single point contact with that portion of the valve seat 12 which the arm 40 engages.

Referring to Fig. 2, it will be noted that the valve seat engaging arm 40 may be adjusted to a position transverse to the angle of the valve seat and fixedly secured on the body 20 by securing the thumb nuts 38 and 44, after which the body 20 may be rotated by means of the annulus 22, and the valve seat engaging member 40 will wipe around the valve seat 12 to gauge the condition of the valve seat surface. The valve seat engaging member 40 is peculiarly adapted to be adjusted for valve seats of any angularity or valve seats of any diameter, and the various adjustments provided make the gauge adaptable to the testing of valve seats of all kinds.

The indicating unit 28, in the form of gauge shown in Figs. 1 and 2, is preferably supported upon a separate indicator head 52 which may comprise a substantially cylindrical body having an eccentrically located bore 53 for receiving the head 24 of the gauge body 20. The head 52 is preferably provided with a transversely extending slot 54 permitting a convenient view of the upper surface 25 of the gauge body 20 and the head 52 may be provided with a retaining member 55 comprising a sheet metal member secured to the head 52 with screw bolts 56 and having a downwardly extending flange 57 for preventing the rocking of the head 52 on the end of body 20.

The flange 57 provides a bearing surface for the annular flange 27 on the end of body 20 at the side of the slot 54, so that the head 52 may rotate freely on the end of gauge body 20, but is guided in its rotation by flange 57. The head 52 is preferably retained on the end of body 20 by a set screw 58 which extends through the head 52 in the bore 53 and into the annular groove 26. The annular groove 26 is of sufficient width with respect to the end of set screw 58, to permit the range of movement which may be desired for actuating the mechanism of indicating unit 28, but the set screw 58 retains the indicating unit and gauge body 20 in assembled position at all times, although it permits sufficient axial movement of the head 52 to secure the indication desired.

The head 52 is preferably provided with a centrally located socket 59 at its upper end for receiving the casing 60 of the indicating unit 28. A bore 61 extends from the socket 59 to the bore 53 and provides space for an actuating plunger 62 which is operatively connected with the indicating mechanism in the indicating unit 28. The lower end of plunger 62 is preferably provided with a head 63 having a ball shaped formation 64 for engaging the flat surface 25 of the gauge body 20. The indicator unit casing 60 may be secured in socket 59 by a plurality of set screws 65 or other convenient fastening means.

In the type of gauge shown in Figs. 1 and 2, the head 52 is preferably fixedly supported on the upper end of a pilot 14 during the gauging operation, and for this purpose the head 52 is provided with a bore 66 axially located with respect to bore 13 and adapted to closely fit the upper end of pilot 14. The head 52 is also preferably provided with a frictional securing device, such as a spring pressed ball 67 which is located in a transverse bore 68 and adapted to engage the upper end 15 of pilot 14.

The bore 68 is preferably threaded and a coil spring 69 is compressed between the ball 67 and an adjustable threaded plug 70. The inner end of bore 68 is tapered as at 71 and provided with an opening 72 of reduced size which is adapted to permit the ball 67 to project from the bore 68, but the inwardly projecting flange 73 retains the ball 67 in the bore 68. The head 52 may be pressed on the upper end of pilot 14 by forcing the end 15 into bore 66, the beveled end 74 of the pilot camming back the ball 67 which frictionally engages the body 15 of the pilot and tends to retain the head 52 in fixed position with respect to the pilot 14. In the gauging operation, however, the body 52 is also preferably held with the fingers of the operator, thereby retaining the indicating unit 28 in fixed position while the gauge body 20 is rotated by means of the fingers applied to annular flange 22.

The indicating unit 28 preferably comprises a dial indicator provided with a casing 60 having a downwardly projecting cylindrical portion 75 which is adapted to be received in socket 59 and which is adapted to slidably support the plunger 62. The lower portion 75 of casing 60 is provided with an annular boss 76 formed with a bore 77 for slidably receiving plunger 62, and a transverse frame member 78 secured by screw bolts 79 to the inner annular surface 80 of casing 60 is provided with an aligned bore 81 for slidably supporting plunger 62.

A sheet metal guide member 82 is likewise secured to the annular surface 80 by screws 83 and is provided with a downwardly extending slot 84 between the two legs 85 for guiding a pin 86 carried by plunger 62.

The lower portion 75 of the casing also houses a wire spring 87 having one end 88 soldered to the casing 60 and the other end 89 hooked over pin 86 and tensioned to urge the pin 86 and plunger 62 downward.

The casing 60 also supports, by means of screw bolts 90, another transverse metal frame member 91 having a centrally located bore 92 for rotatably supporting the upper end of a spindle 93. The lower end of the spindle 93 is journaled in a bore 94 in casing 60. The spindle 93 is preferably provided with an enlarged shaft 95 formed with a worm groove 96 and with a pinion 97. The end of pin 86 extends into worm groove 96 and is adapted to rotate the pinion 93 when plunger 62 is moved axially. The transverse frame member 91 also supports a sheet metal bearing bracket 98, fixedly secured to its lower side by screw bolts 99 and provided with a bore 100 for rotatably receiving one end of a shaft 101, the other end being journaled in the bore 102 in frame member 91.

The shaft 101 supports a gear 103 which meshes with pinion 97 and a spiral spring 104 is wound about the hub of shaft 101 below gear 103, having one end attached to the shaft and having its outer end attached to bracket 98. Spiral spring 104 constantly urges spindle 93 in a counter-clockwise direction and maintains the upper side of groove 96 in engagement with the pin 89 at all times. The springs 104 and 87 constantly take up any lost motion between the motion multiplying mechanism, which connects the plunger 62 and pinion 93, thereby causing the pointer 105 which is carried by pinion 93, to closely follow the movements of the plunger 62 without any back lash.

The casing 60 may be provided with an auxiliary outer casing member 106 of substantially cylindrical form, adapted to receive the casing 60 and having an annular, inwardly extending flange 107 for engaging the bottom of casing 60. The outer case 106 extends above casing 60 and is adapted to enclose and support the dial 107' and transparent cover 108. For this purpose, one or more annular spring washers 109 may be interposed between dial 107' and upper end of casing 60 and the dial 107' may be fixedly secured in outer casing 106 by a split ring 110.

The glass cover or crystal 108 may be secured on the end of outer casing 106 by a bezel ring 111 having an inwardly extending annular flange 112 for engaging the crystal and having a cylindrical body adapted to frictionally engage the outer wall of outer casing 106.

The dial 107' may comprise a cardboard or celluloid plate having a centrally located bore 113 for passing the spindle 93 and having a circular scale with appropriate numerical indicia at regularly spaced scale divisions. If desired, however, only a few scale divisions may be provided along an arcuate line, since the present gauge is intended to measure only a small amount of divergence of the valve surface from the perfect condition.

Referring to Figs. 8 and 9, this modification is more simple than that described in detail with respect to Figs. 1 to 7, but this gauge is preferably provided with an indicating unit, pilot stem, gauge body and gauge arm, identical in construction with that previously described.

The gauge of Figs. 8 and 9 differs from that of Figs. 1 and 2, in that the head 52 in views 8 and 9, is fixedly supported upon the gauge head 20 and the plunger 62 engages the upper end of the pilot stem 14 in Figs. 8 and 9, instead of the upper end of gauge body 20 as in Figs. 1 and 2.

Consequently, when the gauge body 20 is rotated in Figs. 8 and 9, to cause the arm 40 to wipe across the valve seat surface, the dial gauge or indicating unit 28 also rotates with the body 20 and it is more difficult for the eye of the operator to watch the pointer 105 and dial 107, to observe any movement of the pointer. That is, it is more difficult to read an instrument, the scale and pointer of which are rotating.

The operation of the gauge shown in Figs. 1 and 2 is as follows. The reseating operation or valve seat reconstruction, is preferably accomplished with the same pilot stem 14 which is intended to be used with the valve seat gauge. If desired, the divergence of the valve seat from the desired condition may be checked at the beginning of the reseating operation, to show the customer the poor condition of the valve seat by means of the gauge. After the seat has been refinished, the finishing tools are removed from pilot 14 and the gauge assembled, as shown in Figs. 1 or 8. The valve seat engaging arm 40 is preferably adjusted substantially as shown in Fig. 2, with respect to the valve seat, the ball 51 engaging the valve seat 12, and the nuts 38 and 44 being tightened.

The indicating unit 28 may then be held still by grasping the head 52 with the fingers and the gauge body 20 may be rotated by the fingers of the other hand applied to the annular grip 22. During this rotation, the arm 40 will wipe across the valve seat surface 12, but the arm 40 will be rotated in a circle about the axis of the pilot 14. The ball 51 will slide over the valve seat surface 12 and any divergence from true concentricity will permit the ball 51 to drop or rise slightly, which will cause a slight axial movement of the valve gauge body 20.

The same effect would be produced by any depression in the valve seat surface 12 and in the embodiment of Figs. 1 and 2 any downward movement of the body 20 permits the plunger 62 to move downward, causing the pointer 105 to execute a larger movement relative to the dial 107 on account of the motion multiplying mechanism of the indicating unit 28. In such case, the indicating unit 28 and head 52 are supported in fixed position on the upper end of pilot stem 14, and the collar 29 must, of course, be adjusted so that the plunger 62 is not at the lower limit of its movement.

If the valve seat has been properly finished, the gauge will show but a very slight movement of the pointer 107, during the rotation of the gauge body 20, but if there are any irregularities in the valve seat 12, they may be located by means of the valve seat engaging arm 40 which is engaging the irregularities at the time movement of the pointer takes place.

In the embodiment of Figs. 8 and 9, any irregularity of the valve seat surface 12 causes a corresponding axial movement of the gauge body 20 and the indicating unit 28. For instance, a slight projection on the valve seat surface would cause the valve gauge and indicating unit to rise. This would lift the plunger 62 off the end of pilot 14 were it not for the fact that the springs 104 and 87 urge the plunger 62 downward. Consequently, as the valve seat gauge body rises, the plunger 62 extends farther and gives a corresponding indication of the irregularity by means of the pointer 105 on the dial 107.

It will thus be observed that we have invented an improved valve seat gauge which is adapted to be adjusted for valve seats of any irregularity or diameter, and which is adapted to be used to check the valve seats before and after any reseating and reconstructing operations, to show the improved condition of the valve seat or the desirability of refinishing the set.

The improved type of gauge shown in Figs. 1 and 2 may be read more accurately than that shown in Figs. 8 and 9, for the reason that the dial may be held still during the checking operation, and the present valve seat gauge is capable of a high degree of accuracy. The device shown in Figs. 8 and 9, however, has the advantage of greater simplicity of manufacture, and consequently that of greater economy.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a valve seat gauge, the combination of a pilot stem having a tapered portion adapted to be wedged into one end of a valve stem guide and having a cylindrical portion substantially complementary to the medial cylindrical part of said guide, with a gauge having a body movably mounted on said pilot stem, indicating mechanism carried by said gauge body and including a plunger engaging said pilot stem, a gauge arm adapted to engage a valve seat and operative mechanism including said plunger and gauge body connecting said indicating mechanism and said gauge arm whereby said indicating mechanism is adapted to indicate the concentricity of said seat with respect to said guide.

2. In a valve seat gauge, the combination of a pilot stem having a tapered portion adapted to be wedged into one end of a valve stem guide and having a cylindrical portion substantially complementary to the medial cylindrical part of said guide with a gauge having a body rotatably and reciprocably mounted on said pilot stem, indicating mechanism carried by said gauge body and having a part engaging said pilot stem, a gauge arm and means whereby said arm is carried by said body so as to be reciprocated with said body when said arm rotates over irregularities on a valve seat to indicate the elevation of said seat at a predetermined radius from the axis of said guide.

3. In a valve seat gauge, the combination of a pilot stem having a tapered portion adapted to be wedged into one end of a valve stem guide and having a cylindrical portion substantially complementary to the medial cylindrical part of said guide, with a gauge having a body rotatably and reciprocably mounted on said pilot stem, indicating mechanism carried by said gauge body and having a plunger adapted to engage the end of said pilot stem, an adjustable valve seat engaging member and means whereby said member is carried by said gauge body so as to reciprocate said body in response to irregularities in said valve seat on movement of said seat engaging member across the surface of a seat.

4. In a valve seat gauge, the combination of a pilot stem having a tapered portion adapted to be wedged into one end of a valve stem guide, and having a cylindrical portion substantially complementary to the medial cylindrical part of said guide, a gauge having a body rotatably and reciprocably mounted on said pilot stem, indicating mechanism carried by said gauge body and having a plunger adapted to engage the end of said pilot stem, an adjustable collar carried by said gauge body, a rotatable stud carried by said collar, and a valve seat engaging arm slidably adjustable in said stud and rotatably adjustable with said stud.

5. A valve seat gauge comprising a cylindrical body formed with an axial bore for receiving a pilot stem, and carrying a head and having a socket for receiving an indicating unit, a dial indicator carried in said socket and having a plunger for engaging a pilot stem received in the bore of said body, an adjustable collar carried by said cylindrical body, a valve seat engaging arm and means for slidably and pivotally supporting said arm on said collar.

6. A valve seat gauge comprising a cylindrical body formed with an axial bore for receiving a pilot stem, and carrying a head having a socket for receiving an indicating unit, a dial indicator carried in said socket and having a plunger for engaging a pilot stem received in the bore of said body, an adjustable collar carried by said cylindrical body, a depending arm carried by said collar and having a transverse bore, a stud in said bore, a rod having a rounded end, slidably mounted in a bore in said stud and means for clamping said rod against said depending arm.

7. In a valve seat gauge, the combination of a pilot stem adapted to be fixedly secured in a valve guide, with a gauge body slidably and rotatably mounted on said pilot stem, an indicating unit fixedly secured to said gauge body and having a plunger for slidably engaging the end of said pilot stem, an adjustable arm carried by said gauge body for engaging a valve seat, and means for movably mounting said arm on said gauge body for movement in the direction of the length of said arm whereby the effective length of said arm may be adjusted for valve seats of different diameter.

8. In a valve seat gauge, the combination of a pilot stem adapted to be fixedly secured in a valve stem guide, said pilot stem having an upper cylindrical portion, a gauge body rotatably and reciprocably mounted on the cylindrical portion of said pilot stem, a collar carried by said body, a stud rotatably carried by said collar, an arm slidably adjustable in said stud, threaded means for moving said stud axially in said collar to clamp said arm, whereby said arm may be adjusted normal to valve seats of different size and angularity, and means for indicating the axial movement of said gauge body on said pilot stem when said body is rotated to wipe said arm over the surface of a valve seat.

9. In a valve seat gauge, a gauge body comprising a metal member formed with a bore for receiving a part of a pilot stem, said body having an enlarged integral head at its upper end, and said head having a socket for receiving an indicating unit, an indicating unit located in said socket and having a depending plunger located in said bore to engage said pilot stem, means carried by said body for engaging a valve seat whereby the variations in elevation of said valve seat are transmitted to the mechanism of said indicating unit by said plunger.

10. In a valve seat gauge, a gauge body comprising a metal member formed with a bore for receiving a part of a pilot stem, said body having an enlarged integral head at its upper end, and said head having a socket for receiving an indicating unit, an indicating unit located in said socket and having a depending plunger located in said bore to engage said pilot stem, means carried by said body for engaging a valve seat whereby the variations in elevation of said valve seat are transmitted to the mechanism of said indicating unit by said plunger, said head having an inwardly extending slot located at one side below said indicating unit and communicating with said bore at said plunger to give access to said plunger and the end of said pilot.

11. In a valve seat gauge, the combination of a pilot member adapted to be fixedly secured in a valve stem guide, with a body member rotatably and slidably mounted on said pilot member, an indicating unit carried by one of said members and having a feeler projecting into engagement with the other of said members, an adjustable collar carried by said body member and having a depending lug, provided with an aperture, a transverse stud rotatably mounted in said aperture, and a valve seat engaging arm carried by said stud and supported by said collar for angular adjustment, said arm comprising a hardened metal member provided with a hardened ball shaped formation at its seat engaging end for slidably engaging valve seats of different angularity.

In witness whereof, we hereunto subscribe our names this 26 day of September, 1930.

FRANS O. ALBERTSON.
AXEL MADSEN.